Sept. 22, 1959     F. J. RUDMANN, JR     2,905,894
GATED SPECTRUM ANALYZER
Filed Dec. 30, 1954
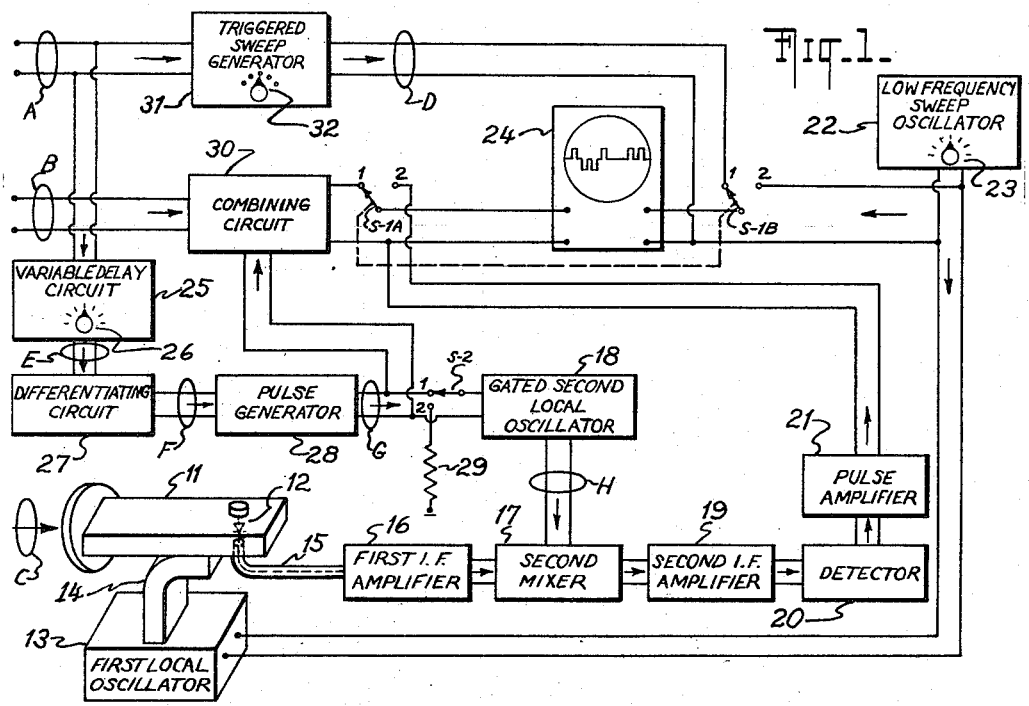
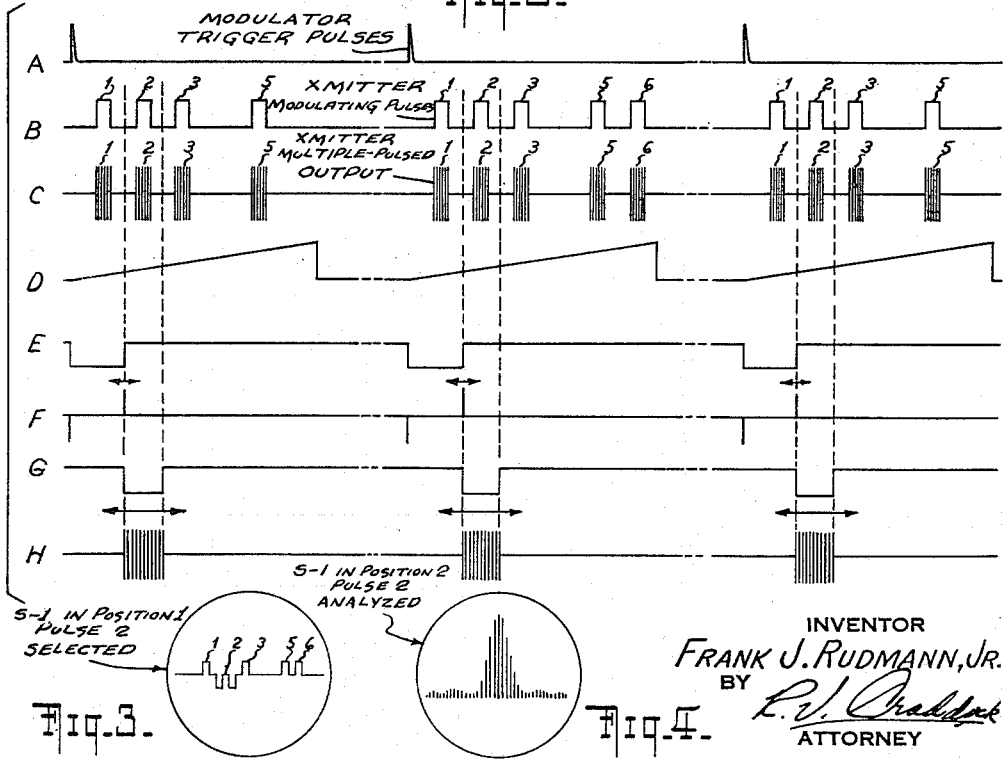
INVENTOR
FRANK J. RUDMANN, JR.
BY
ATTORNEY

United States Patent Office 2,905,894
Patented Sept. 22, 1959

2,905,894

GATED SPECTRUM ANALYZER

Frank J. Rudmann, Jr., Bellerose, N.Y., assignor to Sperry Rand Corporation, a corporation of Delaware Application December 30, 1954, Serial No. 478,859

5 Claims. (Cl. 324—77)

The present invention relates to spectrum analyzers and in particular to a spectrum analyzer for analyzing the frequency spectrum of selected recurrent pulses of a multiple-pulsed radio-frequency wave.

In certain types of radio beacon systems a coded signal is employed to identify and distinguish the beacon stations. The coded beacon signal may be in the form of a recurrent multiple-pulsed radio-frequency wave wherein the number of pulses and the spacing between adjacent pulses in the recurrent pulse groups identify the beacon station. Similar recurrent multiple-pulsed radio-frequency waves are employed in radio guidance systems for guiding movable objects in space. In systems of these types, it is frequently desirable to examine and monitor the frequency spectrum of the multiple-pulsed signals to insure that the transmitters are operating properly. It is especially desirable to examine the spectrum of each individual series of recurrent pulses that comprise the multiple-pulsed wave. It has been discovered that certain radio-frequency generators are not as uniformly responsive to a multiple-pulsed keying or switching voltage as they are to a simple recurrent switching voltage.

The gated spectrum analyzer is a valuable tool for examining the performance of the multiple-pulsed radio-frequency generator. However, while certain of the prior art gated spectrum analyzers perform satisfactorily under certain conditions, they are not completely free of difficulties. For example, where the pulses to be analyzed are very narrow and the spacing between adjacent pulses is short, it is difficult to completely eliminate the response of the spectrum analyzer to the adjacent pulses. Furthermore, it has been difficult to prevent the spectrum analyzer from responding to the gating signal itself. Where the receiver of the spectrum analyzer is rendered periodically responsive by applying a recurrent gating voltage to its mixer or radio-frequency amplifier, spurious switching transients are produced which appear at the output of the spectrum analyzer along with the frequency spectrum of the selected recurrent pulses to be analyzed.

Accordingly, the principal object of the present invention is to provide an improved gated spectrum analyzer for analyzing the spectrum of selected recurrent pulses in a multiple-pulsed radio-frequency wave.

Another object of the invention is to provide a simplified circuit arrangement for gating a spectrum analyzer.

Still another object is to eliminate some of the difficulties existing in the prior art gated spectrum analyzers.

In accordance with the present invention there is introduced an improved gated spectrum analyzer including a superheterodyne receiver wherein the receiver is rendered periodically responsive to an applied radio-frequency wave by supplying pulsed local oscillator signals to the mixer of the receiver. The pulsed local oscillator signals are produced by actuating a local oscillator with recurrent pulses obtained from a variable-delay pulse generator synchronized with the applied multiple-pulsed radio-frequency wave to be analyzed. The time position of the recurrent gating pulses is adjusted by an operator to occur in coincidence with the selected recurrent pulses of radio-frequency energy to be analyzed. The gated spectrum analyzer is solely responsive to the selected recurrent radio-frequency pulses and is non-responsive to the applied recurrent gating pulses.

The improved gated spectrum analyzer of the present invention further includes provision for displaying the envelopes of the multiple-pulsed radio-frequency wave together with the recurrent gating pulses to enable the operator to adjust the time position of the recurrent gating pulses to occur in coincidence with the selected pulses of radio-frequency energy to be analyzed.

The above objects of and the brief introduction to the present invention will be more fully understood and further objects and advantages will become apparent from a study of the following detailed description in connection with the drawings, wherein, Fig. 1 is a block diagram of the improved gated spectrum analyzer of the present invention;

Fig. 2 illustrates waveforms of voltages associated with the block diagram of Fig. 1;

Fig. 3 is a representation of the multiple-pulse modulating wave together with the recurrent gating pulses as they appear on the face of a cathode-ray tube indicator; and Fig. 4 is a cathode-ray tube indication of the frequency spectrum of the selected recurrent radio-frequency pulses.

Referring to Fig. 1, the improved spectrum analyzer of the present invention comprises a superheterodyne receiver including a mixer 11 having a straight section of wave guide open at one end for receiving a coded multiple-pulsed radio-frequency wave. This coded multiple-pulsed radio-frequency wave may be obtained directly from an ultra-high-frequency transmitter. The applied multiple-pulsed radio-frequency energy is mixed in the crystal rectifier 12 with radio-frequency energy from a first local oscillator 13 supplied to mixer 11 over the short section of wave guide 14, in the conventional manner. The component signal from mixer 11 at the difference frequency between the applied multiple-pulsed radio-frequency wave and the energy from the first local oscillator 13 is coupled over a short section of coaxial line 15 to the input of a first intermediate-frequency amplifier 16. The bandwidth of the first I.F. amplifier 16 must be sufficient to pass the frequency components of the multiple-pulsed radio-frequency wave. The output signal from the first I.F. amplifier is coupled to a second mixer 17 where it is combined with energy from a second local oscillator 18. The frequency of the second local oscillator 18 is appreciably lower than the frequency of the first local oscillator 13. The difference frequency component of the signal from the second mixer 17 is selected and amplified by a relatively narrow-band second I.F. amplifier 19 in the conventional manner, and the output from the second I.F. amplifier is detected by detector 20. The detected signal is amplified in pulse amplifier 21 and supplied to position 2 of the single-pole double-throw switch S–1A.

The frequency of the first local oscillator 13 is recurrently swept over a predetermined frequency range by a low-frequency sawtooth sweep oscillator 22. The frequency of this oscillator may be varied by means of knob 23. The output of sweep oscillator 22 is further coupled to position 2 of the single-pole double-throw switch S–1B which is ganged with switch S–1A. When switch S–1 is set to position 2, the vertical deflection amplifier of the cathode-ray tube indicator 24 will receive the output from pulse amplifier 21, and the horizontal deflection amplifier of the cathode-ray indicator will receive the low-frequency sweep voltage from sweep oscillator 22. With the local oscillator 18 supplying a continuous radio-frequency voltage to the second mixer 17, the cathode-ray tube indicator 24 will display the frequency spectrum of the entire applied multiple-pulsed radio-frequency wave.

In order to display the frequency spectrum of certain selected recurrent radio-frequency pulses of the applied multiple-pulsed radio-frequency wave, represented by waveform C of Fig. 2, a provision must be included in the spectrum analyzer to render the superheterodyne receiver responsive only to the desired recurrent radio-frequency pulses. By gating the second local oscillator 18 in coincidence with the desired recurrent pulses of the coded multiple-pulse radio-frequency wave to be analyzed, the spectrum of the selected recurrent pulses may be displayed on the face of the cathode-ray indicator 24.

The second local oscillator 18 is gated by recurrent output pulses from a variable-delay pulse generator system. The time position of the gating pulses is adjustable with respect to the applied coded multiple-pulsed radio-frequency wave. The applied trigger pulses of waveform A of Fig. 2, obtained from the modulator of the UHF transmitter which initiates the coded multiple-pulsed signals, are applied to the input of a variable-delay circuit 25, such as a one-shot multivibrator, to produce a negative output rectangular voltage of waveform E. The duration of the rectangular voltage of waveform E is determined by control knob 26. The rectangular voltage is applied to a differentiating circuit 27 which produces positive output trigger pulses of waveform F corresponding to the trailing edges of the rectangular wave and whose time position is controlled by knob 26. These positive pulses initiate a pulse generator 28 which produces negative recurrent gating pulses of waveform G. These negative gating pulses are supplied to position 1 of switch S-2. Position 2 of switch S-2 is coupled through resistor 29 to a source of negative potential. The gated second local oscillator 18 may be of the gated Hartley type shown in Fig. 4.45 on page 143 of the book "Waveforms" published by the McGraw-Hill Book Company, 1949.

When switch S-2 is set to position 1, the gated second local oscillator produces a pulsed radio-frequency voltage of waveform H corresponding in time to the gating pulse waveform G. When switch S-2 is set to position 2, the negative bias voltage through resistor 29 cuts off the gating tube thereby allowing the second local oscillator 18 to produce a continuous radio-frequency output voltage.

The improved gated spectrum analyzer is provided with an arrangement for selecting the particular periodic radio-frequency pulses to be analyzed by displaying on the face of the cathode-ray tube indicator 24 the waveform B of the modulating pulse wave which energizes the UHF transmitter together with the negative gating pulse voltage of waveform G. A combining circuit 30 receives the modulating pulses of waveform B and the negative gating pulses of waveform G, and supplies these combined pulses to position 1 of switch S-1A. The applied trigger pulses of waveform A trigger a short sweep generator 31 to produce the sweep voltage of waveform D. The duration of this short sweep voltage is under the control of selector switch 32. The short sweep voltage is supplied to position 1 of switch S-1B.

The improved gated spectrum analyzer is adjusted to analyze the frequency spectrum of selected recurrent pulses in a manner now to be described. The switch S-1 is set to position 1 to couple the combined modulating pulse voltage of waveform B and the recurrent gating pulses of waveform G to the input of the vertical deflection amplifier of the cathode-ray tube indicator 24. The short sweep voltage of waveform D is coupled to the input of the horizontal deflection amplifier. The combined pulse voltages of waveforms B and G appear on the face of the cathode-ray indicator as illustrated in Fig. 3. The duration of the short sweep voltage is selected by switch 32 such that the entire group of pulses 1-3, 5 and 6 of the multiple-pulse modulating voltage appears on the face of the cathode-ray tube indicator. The time position of the negative gating pulses of waveform G is adjusted by control knob 26 to select or gate out the recurrent pulses whose frequency spectrum is to be analyzed. Fig. 3 shows the number 2 pulses of the multiple-pulse voltage being selected. With switch S-2 set to position 1, the negative gating pulses of waveform G energize the local oscillator 18 to render the receiver responsive only during the occurrences of the number 2 pulses of the multiple-pulsed radio-frequency wave C. By setting switch S-1 to position 2, the frequency spectrum of the number 2 pulses of waveform C is displayed on the face of the cathode-ray indicator 24, as illustrated in Fig. 4.

The gated local oscillator 18 need not be restricted to the type referred to in the aforementioned book "Waveforms" but may be of any type which will supply a pulsed local oscillator voltage of waveform H to mixer 17.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A spectrum analyzer comprising in combination a first mixer adapted to receive a recurrent multiple-pulsed radio-frequency wave, a first local oscillator coupled to said first mixer, a sweep oscillator coupled to said first local oscillator for sweeping the frequency of said local oscillator over a predetermined range, a first intermediate-frequency amplifier coupled to the output of said first mixer, a second mixer coupled to the output of said first intermediate-frequency amplifier, a second local oscillator coupled to said second mixer, a second intermediate-frequency amplifier coupled to the output of said second mixer, said second intermediate-frequency amplifier having an appreciably narrower band width than said first intermediate-frequency amplifier, detector means coupled to the output of said second intermediate-frequency amplifier, means including a cathode-ray tube indicator coupled to the output of said detector means, means coupling the output from said sweep oscillator to said cathode-ray tube indicator, said sweep oscillator deflecting the cathode-ray beam in synchronism with the sweeping of the frequency of said first local oscillator, variable-delay pulse generator means coupled to said second local oscillator, said variable-delay pulse generator means being adapted to be energized by an applied recurrent pulse wave in synchronism with the applied recurrent multiple-pulsed radio-frequency wave, said variable-delay pulse generator means producing recurrent gating pulses for actuating said second local oscillator, said recurrent gating pulses having a width greater than the width of the individual pulses of said multiple-pulsed radio-frequency wave, and means coupled to said variable-delay pulse generator means for varying the time position of said recurrent gating pulses for actuating said local oscillator throughout the occurrence of selected recurrent pulses of said multiple-pulsed radio-frequency wave, said cathode-ray tube indicator displaying the frequency spectrum of said selected recurrent pulses of said applied multiple-pulsed radio-frequency wave.

2. A radio receiver responsive to applied recurrent radio-frequency pulses comprising in combination, a first mixer adapted to receive said recurrent radio-frequency pulses, a first local oscillator coupled to said first mixer, a sweep oscillator coupled to said first local oscillator for sweeping the frequency of said first local oscillator over a predetermined range, a first intermediate-frequency amplifier coupled to the output of said first mixer, a second mixer coupled to the output of said first intermediate-frequency amplifier, a second local oscillator coupled to said second mixer, a second intermediate-frequency amplifier coupled to the output of said second mixer, detector means coupled to the output of said second intermediate-frequency amplifier, variable-delay pulse generator means coupled to said second local oscillator, said variable-delay pulse generator means being adapted to be energized by applied recurrent trigger pulses in synchronism with said applied recurrent radio-frequency pulses, said variable-delay pulse generator means producing recurrent gating pulses for actuating said second local oscillator, said radio receiver being responsive throughout the duration of said recurrent gating pulses and being non-responsive in the interval between gating pulses, means coupled to said variable-delay pulse generator means for varying the time position of said recurrent gating pulses, and means coupled to the signal output of said detector means and to the signal output of said sweep oscillator for indicating the relative time difference between the initiation of the sweep oscillator signal and the occurrence of the output signal of said detector means.

3. A spectrum analyzer comprising in combination, a first mixer adapted to receive a recurrent multiple-pulsed radio-frequency wave, a first local oscillator coupled to said first mixer, a sweep oscillator coupled to said first local oscillator for sweeping the frequency of said local oscillator over a predetermined range, a first intermediate-frequency amplifier coupled to the output of said first mixer, a second mixer coupled to the output of said first intermediate-frequency amplifier, a second local oscillator coupled to said second mixer, a second intermediate-frequency amplifier coupled to the output of said second mixer, detector means coupled to the output of said second intermediate-frequency amplifier, means including a cathode-ray tube indicator coupled to the output of said detector means, means coupling the output from said sweep oscillator to said cathode-ray tube indicator, said sweep oscillator deflecting the cathode-ray beam in synchronism with the sweeping of the frequency of said first local oscillator, and variable-delay pulse generator means coupled to said second local oscillator, said variable-delay pulse generator means being adapted to be energized by an applied recurrent pulse wave in synchronism with the applied recurrent multiple-pulsed radio-frequency wave, said variable-delay pulse generator means producing recurrent gating pulses for actuating said second local oscillator, said cathode-ray tube indicator being adapted to display the frequency spectrum of the recurrent pulses selected from said applied multiple-pulsed radio-frequency wave.

4. A spectrum analyzer comprising in combination, a first mixer adapted to receive a recurrent multiple-pulsed radio-frequency wave, a first local oscillator coupled to said first mixer, a first intermediate-frequency amplifier coupled to the output of said first mixer, a second mixer coupled to the output of said first intermediate-frequency amplifier, a second local oscillator coupled to said second mixer, a second intermediate-frequency amplifier coupled to the output of said second mixer, detector means coupled to the output of said second intermediate-frequency amplifier, means including a cathode-ray tube indicator coupled to the output of said detector means, a sweep oscillator coupled to one of said first and second local oscillators for sweeping the frequency of said one local oscillator over a predetermined range, means coupling the output from said sweep oscillator to said cathode-ray tube indicator, said sweep oscillator deflecting the cathode-ray beam in synchronism with the sweeping of the frequency of said one local oscillator, and variable-delay pulse generator means coupled to the other of said first and second local oscillators, said variable-delay pulse generator means being adapted to be energized by an applied recurrent pulse wave in synchronism with the applied multiple-pulsed radio-frequency wave, said variable-delay pulse generator means producing recurrent gating pulses for actuating said other local oscillator, said cathode-ray tube indicator being adapted to display the frequency spectrum of the recurrent pulses selected from said applied multiple-pulsed radio-frequency wave.

5. In a spectrum analyzer adapted to receive and analyze recurrent groups of radio-frequency signals, a first mixer adapted to receive said radio-frequency signals, a first local oscillator coupled to said first mixer, a first intermediate-frequency amplifier coupled to the output of said first mixer, a second mixer coupled to the output of said first intermediate-frequency amplifier, a second local oscillator coupled to said second mixer, a sweep oscillator coupled to one of said first and second local oscillators for sweeping the frequency of said one local oscillator over a predetermined range, pulse generator means for producing a pulse signal at a controllable time after receipt of a trigger signal coupled to the other of said first and second local oscillators, said pulse generator means being adapted to be triggered by applied recurrent trigger pulses in synchronism with said recurrent groups of radio-frequency signals, said pulse signal of said pulse generator means being adapted for actuating said other local oscillator and means coupled to the respective signal outputs of said second mixer and said sweep oscillator for indicating the relative time difference between the initiation of the sweep oscillator signal and the occurrence of the output signals of said second mixer.

References Cited in the file of this patent

UNITED STATES PATENTS

| | | |
|---|---|---|
| 2,482,128 | Schmid | Sept. 20, 1949 |
| 2,502,454 | Grieg | Apr. 4, 1950 |
| 2,537,132 | Guanella | Jan. 9, 1951 |
| 2,608,652 | Heller | Aug. 26, 1952 |
| 2,639,377 | Stone | May 19, 1953 |
| 2,691,776 | Brandon | Oct. 12, 1954 |
| 2,778,933 | Crist | Jan. 22, 1957 |

FOREIGN PATENTS

| | | |
|---|---|---|
| 140,601 | Australia | Apr. 3, 1949 |